United States Patent [19]

Herder et al.

[11] Patent Number: 4,574,227
[45] Date of Patent: Mar. 4, 1986

[54] DUAL MODE SERVO

[75] Inventors: John C. Herder; Randall G. Guay, both of San Antonio, Tex.

[73] Assignee: Datapoint Corporation, San Antonio, Tex.

[21] Appl. No.: 550,950

[22] Filed: Nov. 14, 1983

[51] Int. Cl.⁴ ...................... G05B 11/18; G05B 13/00
[52] U.S. Cl. .................... 318/594; 318/592; 318/561; 318/619; 318/616
[58] Field of Search ............... 318/594, 595, 592, 590, 318/561, 611, 616, 615, 617, 618, 619, 620, 624; 364/180, 182

[56] References Cited

U.S. PATENT DOCUMENTS

| 4,184,108 | 1/1980 | Sordello | 318/618 |
| 4,219,765 | 8/1980 | Morsing | 318/619 X |
| 4,282,469 | 8/1981 | Moriyama | 318/619 |
| 4,315,198 | 2/1982 | Lin | 318/594 |

Primary Examiner—William M. Shoop, Jr.
Assistant Examiner—Patrick C. Keane
Attorney, Agent, or Firm—McCamish, Ingram, Martin & Brown

[57] ABSTRACT

A dual mode, digital servo positioning system controls servo motor current by a processor-generated current control set point in conjunction with velocity feedback. When the motor has advanced to the vicinity of a target position, the processor opens the velocity feedback loop and reduces servo amplifier gain, such that the set point controls motor current without velocity feedback. This open loop condition provides a springy servo response that eliminates oscillation due to small deviations from target position caused by electronic drift or gravity. Position information is provided to the processor by means of quadrature encoded tachometer pulses from the motor.

7 Claims, 2 Drawing Figures

DUAL MODE SERVO

BACKGROUND

The present invention is directed to servo control systems, and in particular, to velocity servo systems. The specific application of the present invention is a servo system control for positioning a vertical-travel paper picker for a multi-input-bin printing apparatus.

Servo systems to control positioning an object such as the paper picker for a printer apparatus are of two general types—position servos and velocity servos.

Position servos utilize position and velocity feedback to obtain high resolution (i.e. precise positional and translational control), including the ability to continuously hold a particular target position (zero velocity). However, such position servos exhibit a number of disadvantages. Analog implementations require extensive analog hardware to develop reliable analog position information, including cumbersome calibration circuitry. In digital implementations, executing the algorithm required to calculate velocity and acceleration for precise positional control requires extensive processing time.

Digital velocity servos require significantly less processor time than digital position servos. The processor merely provides a servo current-control set point based upon relative distance from target position (typically by a look-up-table operation) to control a high gain amplifier in conjunction with velocity feedback. However, velocity servos are disadvantageous in that holding a target position (zero velocity) is problematic. When a particular target position is achieved, positional deviations unavoidably occur (such as from electronic drift) resulting in a positional error. While this positional error is relatively small, the resulting velocity derivative in the velocity feedback loop is relatively large (i.e. the velocity servo exhibits low resolution at the target position. Because of the relatively high gain of the amplifier (required for accurate translational movement), the set point correction for such positional deviations result in unavoidable target overshoot that causes oscillation about the target position.

For example, to reposition a vertical-travel paper picker the current-control set point is gradually decreased until, at the target position, the set point goes to zero. However, drift in the control electronics and gravity cause deviation from target position. The resulting compensating velocity derivative of this positional deviation in the velocity feedback loop causes continual overshoot such that the servo motor is alternately driven positively and negatively, putting excessive strain on the power drive and needlessly dissipating power in the motor to maintain position.

SUMMARY

The present invention provides an improved servo positioning system for controlling a servo motor, for example, to translate a paper picker between target picking positions. The positioning system includes a servo power amplifier whose motor current output is controlled by a summing amplifier responsive (i) to a current-control set point and, during initial advance, (ii) to velocity feedback. When target position is approached, the velocity feedback loop is opened and the gain of the summing amplifier is reduced, such that the set point alone controls the output from the servo power amplifier in a low-gain, high resolution mode that minimizes over-compensation for positional drift about target position. Processor means is responsive to motor positional information to provide the current-control set point, and when target position is approached, to open the velocity feedback loop and switch the summing amplifier from a high gain to low gain state.

For a preferred embodiment, the summing amplifier also receives current feedback to provide a higher-order velocity derivative feedback that smooths servo response. Velocity feedback is provided by a digital tachometer (quadrature encoded) coupled through a gate to a frequency/voltage converter. The gate is controlled by an open-loop signal from the processor to open the velocity feedback loop when target position is approached. Position information is provided by quadrature-decoding position logic that latches successive position-change and motor-direction indications for input to the processor means. This positional information is used by the processor to track motor (i.e. picker) position, and to provide the current-control set point and the open loop and gain control signals.

From the foregoing summary, and the following detailed description of a preferred embodiment, the present servo positioning system provides the advantages of velocity servo control, while avoiding over-compensation and oscillation in maintaining a target position (zero velocity). By eliminating velocity feedback and lowering amplifier gain, the servo system responds slower and with higher resolution to small deviations from target position. In addition, the processor can be programmed to ignore a predetermined narrow range of position deviation (dead band). The result is a springy response to deviations in maintaining target position, with resulting decreased compensating power demands.

BRIEF DESCRIPTION OF THE DRAWINGS

A more complete understanding of the present invention can be had by reference to the following detailed description of a preferred embodiment when considered in conjunction with the accompanying drawings in which.

PREFERRED EMBODIMENT

Figure 1:
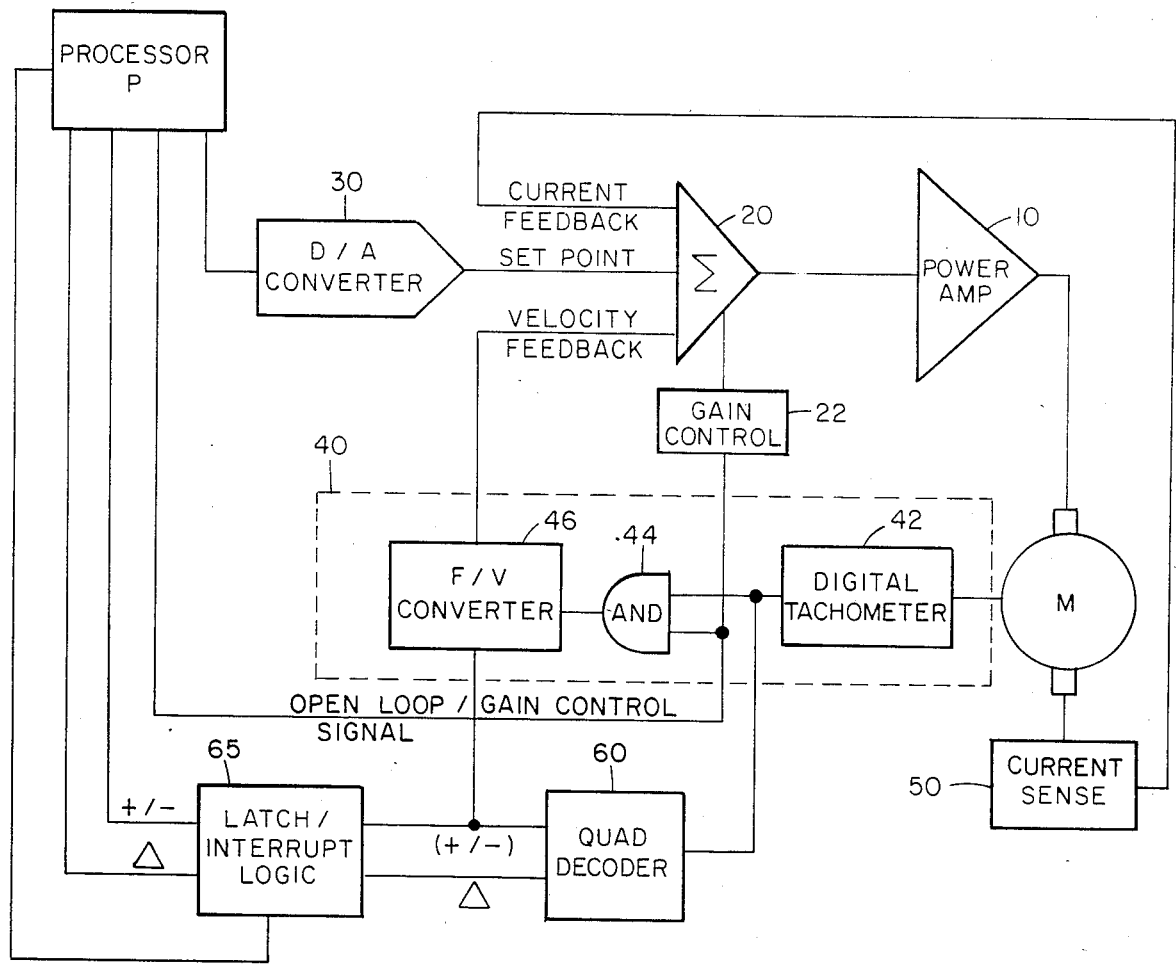
FIG. 1 is a schematic circuit diagram for the position control system of the present invention.

The digital servo positioning system of the present invention (shown schematically in FIG. 1) will be described in relation to controlling the translation to a new target position of a paper picker mechanism for a multi-input-bin printer apparatus. The invention is not limited to such an application, but rather, has general applicability to servo systems in printers, robotics and other fields.

The servo positioning system controls a motor M in response to commands/signals from a processor P which receives status inputs from the servo system. Neither the motor nor the processor form a part of the present invention. An exemplary motor comprises a standard, permanent magnet, DC motor incorporating a quadarature tachometer wheel to provide quadrature encoded tachometer pulses. The processing function can be performed by special purpose logic, but typically is provided by a general purpose printer-control processor executing servo control subroutines in response to interrupts from the servo positioning system. (Instead of responding to interrupts, the processor can poll the servo system for status inputs as desired.)

The current to drive motor M is provided by a power amplifier stage 10 in response to the current control output from a gain-controlled summing amplifier stage 20.

Summing amplifier 20 is responsive to a current-control set point from a digital/analog circuit 30, with feedback inputs from both velocity and current feedback loops. Velocity feedback is derived from a velocity feedback loop indicated at 40. Current feedback is derived from a current sense network 50. The current feedback input to the summing amplifier provides a higher order velocity derivative feedback that smooths servo response.

The velocity feedback loop 40 includes a digital tachometer 42 that receives quadrature encoded tachometer signals from motor M and outputs quadrature encoded position-change pulses. The tachometer output is provided both to an AND gate 44 and a quadrature decoder 60.

AND gate 44 couples the position-change pulses to a frequency/voltage converter 46, unless disabled by an open-loop signal from the processor. For each position change pulse, quadrature decoder 60 decodes quadrature to provide the frequency/voltage converter with a sign input corresponding to the direction of motor rotation. Frequency/voltage converter 46 provides the velocity feedback input to summing amplifier 20 corresponding in magnitude to the frequency of the digital position-change pulses (i.e. the velocity of the motor), with feedback sign being determined by corresponding motor rotation signals from quadrature decoder 60.

Summing amplifier 20 includes a gain control network 22, switchable from a high gain to a low gain state in response to a gain control signal from the processor. In a preferred implementation, gain control network 22 comprises an additional resistor that is FET-switched into the amplifier gain circuitry of the summing amplifier in response to the gain control signal, thereby lowering the gain for the summing amplifier.

Position information from decoder 60 is latched in a latch/interrupt logic network 65 for retrieval by the processor. The quadrature-encoded position-change pulses from tachometer 42 are applied to decoder 60, which outputs both position-change signals and corresponding quadrature-decoded motor-direction signals. Successive position-change and direction signals are independently latched in the latch/interrupt logic, which simultaneously provides an interrupt signal to the processor.

Figure 2:
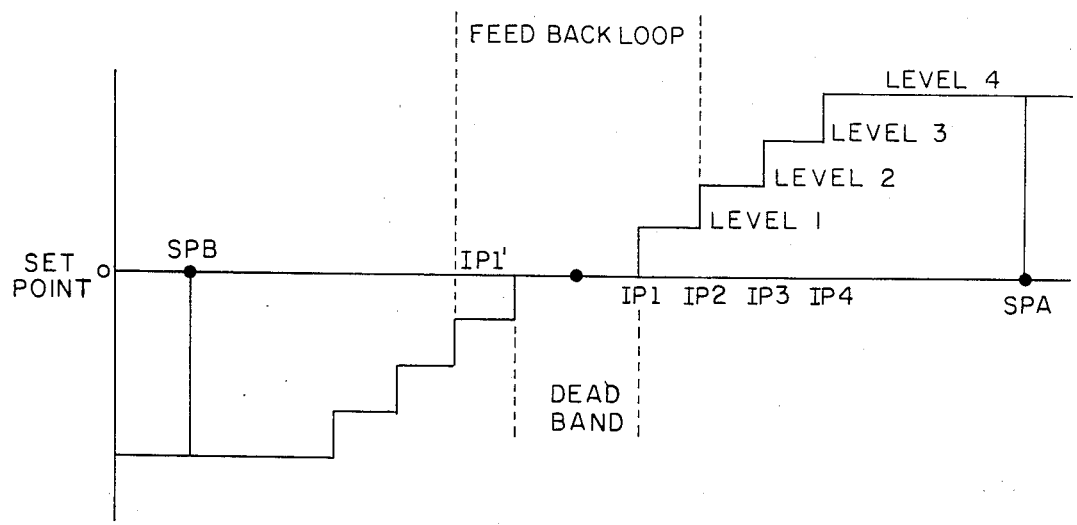
FIG. 2 is a representation of set point level as a function of distance from target position.

The operation of the servo positioning system will be described with reference to the schematic representation in FIG. 2 showing current-control set point (vertical axis) in relation to position (horizontal axis). A target position is represented at TP on the position axis, while initial starting positions above and below the target position are represented at SPA and SPB.

For a preferred embodiment, the processor's servo positioning software includes two subroutines—position and set point. Processor P stores a starting motor position corresponding to the starting position of the paper picker (i.e. SPA or SPB in FIG. 2). In response to an initial position-seek, the position subroutine is called to provide an indication of distance to target position (i.e. SPA to TP). Next, the set point subroutine is called to provide an appropriate set point level by a look-up table function. With each position-change and motor direction update received from the latch/interrupt logic, the position and set point subroutines are called to update the processors set point output. When target position is approached to within a predetermined distance, the set point subroutine causes the processor to output, in addition to a new set point, an open-loop command causing the velocity feedback loop to open and a gain-control command lowering the gain of the summing amplifier 20. When target position has been reached, and the processor provides a null set point; small deviations from target position are permitted in a dead band (IP1–IP1′ in FIG. 2) without the set point subroutine causing the processor to change its null set point output.

Thus, in response to the position-seek instruction to move the paper picker to a new target position (TP), the processor provides an initial, maximum servo current control set point to set-point D/A converter 30. At the same time, the processor enables AND gate 44 to close the velocity feedback loop, and switches gain control network 22 to a high gain state.

Summing amplifier 20 provides a current control output in response to (a) the set point from D/A converter 30, and (b) velocity and current feedback inputs. The current control output from the summing amplifier drives the power amplifier stage, providing current to motor M which accelerates to the set point velocity. Quadrature encoded tachometer pulses from the motor are converted by digital tachometer 42, quadrature decoder 60 and frequency/voltage converter 46 to the velocity feedback input to the summing amplifier 20.

While the motor is translating the paper picker toward the target position (TP), the processor receives continual motor picker position information via decoder 60 and latch/interrupt logic 65. In response, the processor provides a predetermined set point to D/A converter 30. By way of illustration, FIG. 2 shows five discrete set point levels (0 to 4) between starting (SPA or SPB) and target positions (TP). Thus, as the motor translates the paper picker between the starting position and intermediate position IP4 motor current (velocity) is set at a maximum by a level 4 set point. Between intermediate positions IP4 and IP3 the processor provides a lower level 3 set point, while between intermediate positions IP3 and IP2 the processor outputs a level 2 set point.

When motor position (i.e. paper picker position) is a predetermined distance from target position, the processor provides an open-loop signal to disable AND gate 44, inhibiting the input of position-change pulses to frequency/voltage converter 46 thereby opening the velocity feedback loop. In addition, the processor switches gain control network 22 to the low gain state for summing amplifier 20. Referring to FIG. 2, when the motor has translated the paper picker to intermediate position IP2, the processor reduces the current control set point to level 1 and at the same time opens the velocity feedback loop and switches the summing amplifier to the low gain state. When the paper picker passes intermediate position IP1, the processor nulls the set point (level O), shutting off current to the motor.

With velocity feedback eliminated, the current control signal output from summing amplifier 20 is determined by the current-control set point (level 1 or 0), together with the higher order derivative current feedback. Thus, over-compensation for small deviations from target position which would result from the combination of velocity feedback and high summing amplifier gain is eliminated. The resulting high resolution current control output from summing amplifier 20 causes the power amplifier stage to respond slowly to positional deviations. This springy servo operation in the vicinity of target position avoids unnecessary overcompensation and reduces power dissipation in holding the motor, and the paper picker, at the target position.

For a preferred embodiment, a predetermined dead band (IP1 to IP1' in FIG. 2) is provided around the target position (TP) permitting the paper picker to deviate from the target position without causing the processor to switch from the null level 0 to the level 1 set point. If positional drift exceeds this dead band deviation such that the paper picker passes intermediate position IP1 or IP1' the processor outputs the level 1 set point to cause position correction without closing the velocity feedback loop or raising amplifier gain.

While the invention has been described with respect to a preferred embodiment, those of ordinary skill in the art will understand that the invention is not thereby limited, but rather that the limits of the invention are to be interpreted only in conjunction with the appended claims.

The embodiments of the invention in which an exclusive property or privilege is claimed are as follows:

1. A servo positioning system for controlling a servo motor to a selectable target position, comprising:
   (a) processor means responsive to the motor position relative to the target position to provide (i) a current-control set point signal, and when the motor is translated to a preselected open-loop position near target position, (ii) a gain control and an open-loop signal;
   (b) a servo power amplifier responsive to a current control signal from a summing amplifier to provide current to the servo motor; and
   (c) a velocity feedback loop responsive to the velocity of said servo motor to provide a velocity feedback signal unless disabled by said open-loop signal;
   (d) said summing amplifier being responsive (i) to said current-control set point signal, and (ii) said velocity feedback signal unless disabled by an open loop condition, to provide said current control signal to the servo power amplifier;
   (e) said summing amplifier being switchable from a high gain state at the beginning of motor advance to a low gain state at an open-loop position selectably proximate to the target position in response to said gain control signal;
   (f) such that when said motor is proximate to target position, said summing amplifier is switched to its low gain state and said velocity feedback signal is disabled, opening the velocity feedback loop;
   (g) the output of said power amplifier, and therefore the velocity of the motor, being thereby determined by said set point.

2. The servo positioning system defined in claim 1, wherein said velocity feedback loop comprises:
   (a) a digital tachometer providing position-change pulses corresponding to changes in motor position;
   (b) a frequency/voltage converter responsive to the position-change pulse output from said tachometer to provide a feedback voltage corresponding to the velocity of said motor;
   (c) a gate responsive to an open-loop signal to inhibit the application of the position-change pulses to said frequency/voltage converter.

3. The servo positioning system defined in claim 2, further including position logic responsive to the position-change signals from said digital tachometer to provide position information to said processor means.

4. The servo positioning system defined in claim 3, wherein said motor provides quadrature encoded position pulses to said digital tachometer.

5. The servo positioning system defined in claim 4, wherein said position logic comprises a quadrature decoder for decoding the direction of motor movement, and latch/interrupt logic for latching position change and motor direction information for input to said processor means.

6. The servo position control system defined in claim 4, further including digital/analog converter means for providing an analog set point signal to said summing amplifier in response to a digital velocity set point from said processor means.

7. The servo position control system defined in claim 6 or 3, further including current feedback means for providing a current feedback signal to said summing amplifier means representative of current input to said motor.

* * * * *